US011421148B1

(12) United States Patent
Al-Yousif et al.

(10) Patent No.: US 11,421,148 B1
(45) Date of Patent: Aug. 23, 2022

(54) INJECTION OF TAILORED WATER CHEMISTRY TO MITIGATE FOAMING AGENTS RETENTION ON RESERVOIR FORMATION SURFACE

(71) Applicant: Saudi Arabian Oil Company, Dhahran (SA)

(72) Inventors: Zuhair Al-Yousif, Saihat (SA); Muhammad Majid Almajid, Qatif (SA); Subhash Ayirala, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/307,729

(22) Filed: May 4, 2021

(51) Int. Cl.
*E21B 43/16* (2006.01)
*C09K 8/594* (2006.01)
*C09K 8/584* (2006.01)

(52) U.S. Cl.
CPC .............. *C09K 8/594* (2013.01); *C09K 8/584* (2013.01); *E21B 43/162* (2013.01)

(58) Field of Classification Search
CPC ........ C09K 8/584; C09K 8/594; E21B 43/162
See application file for complete search history.

(56) References Cited

U.S. PATENT DOCUMENTS

| 1,784,214 A | 12/1930 | Workman |
|---|---|---|
| 2,795,279 A | 6/1957 | Erich |
| 2,799,641 A | 7/1957 | Gordon |
| 3,417,823 A | 12/1968 | Faris |
| 3,469,630 A | 9/1969 | Hurd et al. |
| 3,507,330 A | 4/1970 | Gill |
| 3,542,066 A | 11/1970 | Cordova |
| 3,605,888 A | 9/1971 | Crowson et al. |

(Continued)

FOREIGN PATENT DOCUMENTS

| EP | 2596208 | 5/2013 |
|---|---|---|
| EP | 2572187 | 7/2020 |

(Continued)

OTHER PUBLICATIONS

U.S. Appl. No. 17/190,271, Cha et al., filed Mar. 2, 2021.

(Continued)

*Primary Examiner* — Silvana C Runyan
(74) *Attorney, Agent, or Firm* — Fish & Richardson P.C.

(57) ABSTRACT

Compositions and methods for treating a subterranean formation. The compositions can include positively and negatively charged divalent ions and a total dissolved solids concentration between 2000 and 3000 ppm. In some implementations, the composition includes calcium and magnesium ions. In some implementations, the composition includes sodium, chloride, and bicarbonate ions. In some implementations, the composition includes iodide, phosphate, or borate ions, or any combination thereof. Methods for treating the subterranean formation can include flowing a first aqueous solution that includes sodium ions into the subterranean formation and flowing a second aqueous solution that has a lower salinity than the first aqueous solution into the subterranean formation, where the second aqueous solution includes positively charged divalent ions, negatively charged divalent ions, and a total dissolved solids concentration between 2000 and 30000 ppm.

18 Claims, 3 Drawing Sheets

(56) References Cited

U.S. PATENT DOCUMENTS

| | | | |
|---|---|---|---|
| 3,724,543 | A | 4/1973 | Bell et al. |
| 3,782,465 | A | 1/1974 | Bell et al. |
| 4,296,812 | A | 10/1981 | Kalfoglou |
| 4,313,500 | A | 2/1982 | Johnson, Jr. et al. |
| 4,473,114 | A | 9/1984 | Bell et al. |
| 4,495,990 | A | 1/1985 | Titus et al. |
| 4,643,256 | A | 2/1987 | Dilgren et al. |
| 4,982,789 | A | 1/1991 | Prukop |
| 4,997,044 | A | 3/1991 | Stack |
| 5,042,297 | A | 8/1991 | Lessi |
| 5,109,922 | A | 5/1992 | Joseph |
| 5,191,557 | A | 3/1993 | Rector et al. |
| 5,517,024 | A | 5/1996 | Mullins et al. |
| 5,868,030 | A | 2/1999 | Burmley et al. |
| 6,555,009 | B2 | 4/2003 | Varadaraj |
| 6,691,781 | B2 | 2/2004 | Grant et al. |
| 6,814,141 | B2 | 11/2004 | Huh et al. |
| 6,877,556 | B2 | 4/2005 | Wittie et al. |
| 6,942,043 | B2 | 9/2005 | Kurkoski |
| 7,077,199 | B2 | 7/2006 | Vinegar et al. |
| 7,121,342 | B2 | 10/2006 | Vinegar et al. |
| 7,152,682 | B2 | 12/2006 | Hopper |
| 7,326,931 | B2 | 2/2008 | Frodl et al. |
| 7,352,179 | B2 | 4/2008 | Chen et al. |
| 7,704,746 | B1 | 4/2010 | White et al. |
| 7,853,045 | B2 | 12/2010 | Touati et al. |
| 7,866,383 | B2 | 1/2011 | Dusterhoft et al. |
| 7,980,301 | B1 | 7/2011 | Kostrov et al. |
| 8,327,941 | B2 | 12/2012 | Hackworth et al. |
| 8,377,730 | B2 | 2/2013 | Yang et al. |
| 8,466,799 | B2 | 6/2013 | Kim et al. |
| 8,684,076 | B2 | 4/2014 | Kostrov et al. |
| 8,776,880 | B2 | 7/2014 | Pich et al. |
| 8,950,495 | B2 | 2/2015 | Barbour et al. |
| 8,985,206 | B2 | 3/2015 | Morvan et al. |
| 9,133,709 | B2 | 9/2015 | Huh et al. |
| 9,212,542 | B2 | 12/2015 | Fripp et al. |
| 9,284,480 | B2 | 3/2016 | Han et al. |
| 9,328,597 | B2 | 5/2016 | Morys |
| 9,394,769 | B2 | 7/2016 | Nenniger |
| 9,727,928 | B2 * | 8/2017 | Heneman ............... G06Q 40/00 |
| 9,745,833 | B2 | 8/2017 | Carvajal et al. |
| 9,969,928 | B2 | 5/2018 | He et al. |
| 10,000,687 | B2 | 6/2018 | Al-Yousef et al. |
| 10,041,339 | B2 | 8/2018 | Jerauld et al. |
| 10,107,056 | B2 | 10/2018 | Zhang et al. |
| 10,174,597 | B2 * | 1/2019 | Looijer ................... E21B 43/20 |
| 10,184,904 | B1 | 1/2019 | Gong et al. |
| 10,196,886 | B2 | 2/2019 | Tolman et al. |
| 10,287,486 | B2 | 5/2019 | Ayirala et al. |
| 10,563,492 | B2 | 2/2020 | Stokholm et al. |
| 10,677,046 | B2 | 6/2020 | Mohaghegh et al. |
| 10,705,047 | B2 | 7/2020 | Mohanty et al. |
| 2002/0035040 | A1 | 3/2002 | Talashek et al. |
| 2005/0087001 | A1 | 4/2005 | Irani |
| 2005/0199387 | A1 | 9/2005 | Wittie et al. |
| 2008/0224717 | A1 | 9/2008 | Kim et al. |
| 2009/0110242 | A1 | 4/2009 | Touati et al. |
| 2009/0277634 | A1 * | 11/2009 | Case ....................... E21B 21/062 |
| | | | 166/275 |
| 2010/0044047 | A1 | 2/2010 | Kabishcher et al. |
| 2011/0015874 | A1 | 1/2011 | Song et al. |
| 2011/0301061 | A1 | 12/2011 | McDaniel et al. |
| 2011/0306525 | A1 | 12/2011 | Lightheim |
| 2012/0039668 | A1 | 2/2012 | Park et al. |
| 2012/0111093 | A1 | 5/2012 | Brahim et al. |
| 2012/0116443 | A1 | 5/2012 | Ferrera et al. |
| 2012/0125604 | A1 | 5/2012 | Willingham et al. |
| 2012/0127466 | A1 | 5/2012 | Karnes et al. |
| 2012/0140058 | A1 | 6/2012 | McDaniel et al. |
| 2013/0026082 | A1 | 1/2013 | Al-Shafei et al. |
| 2013/0081459 | A1 | 4/2013 | Merniche |
| 2013/0108865 | A1 | 5/2013 | Boulanger et al. |
| 2013/0274149 | A1 | 10/2013 | Lafitte et al. |
| 2013/0277046 | A1 | 10/2013 | Haroun et al. |
| 2014/0039793 | A1 | 2/2014 | Querales |
| 2014/0291591 | A1 | 10/2014 | Jeon et al. |
| 2014/0338903 | A1 | 11/2014 | Mahmoud et al. |
| 2015/0198018 | A1 * | 7/2015 | Farajzadeh ............ C09K 8/584 |
| | | | 166/309 |
| 2016/0009981 | A1 | 1/2016 | Teklu et al. |
| 2016/0024372 | A1 | 1/2016 | Fathi Najafabadi |
| 2016/0061003 | A1 | 3/2016 | Gottumukkala et al. |
| 2018/0011211 | A1 | 1/2018 | Leonard |
| 2018/0030816 | A1 | 2/2018 | Devalve et al. |
| 2018/0224391 | A1 | 8/2018 | Choa et al. |
| 2018/0253514 | A1 | 9/2018 | Bryant et al. |
| 2018/0291717 | A1 | 10/2018 | Ayirala et al. |
| 2018/0328152 | A1 | 11/2018 | Hart et al. |
| 2018/0347326 | A1 | 12/2018 | Shammari et al. |
| 2019/0194524 | A1 | 6/2019 | Ayirala et al. |
| 2020/0115620 | A1 * | 4/2020 | Ayirala ................... C09K 8/588 |

FOREIGN PATENT DOCUMENTS

| | | |
|---|---|---|
| JP | 6160267 | 7/2017 |
| KR | 101301953 | 8/2013 |
| RU | 2215129 | 10/2003 |
| TW | 201743031 | 12/2017 |
| WO | WO 2004053468 | 6/2004 |
| WO | WO 2005036181 | 4/2005 |
| WO | WO 2011014202 | 2/2011 |
| WO | WO 2014160626 | 10/2014 |
| WO | WO 2016205158 | 12/2016 |
| WO | WO 2018160068 | 9/2018 |

OTHER PUBLICATIONS

U.S. Appl. No. 17/249,461, Cha et al., filed Mar. 2, 2021.

Abdulredha et al., "Overview on petroleum emulsions, formation, influence and demulsification treatment techniques," Arabian Journal of Chemistry, vol. 13, No. 1, Nov. 22, 2018, 26 pages.

Advincula, "Superhydrophobic Coatings and oil and Water Separation," Paper No. 9585, Nace International, Corrosion Conference and Expo, Mar. 26-30, 2017, 7 pages.

Al Hamad et al., "Dynamic Water Flooding in Carbonates: The Role of Iodide Ions," SPE-188026-MS, presented at the SPE Kingdom of Saudi Arabia Annual Technical Symposium and Exhibition, Dammam, Saudi Arabia, Apr. 2017, 17 pages.

Al-Anazi et al., "Innovative Production Optimization Technique for Smart Well Completions Using Real-Time Nodal Analysis Applications," SPE-189198-MS, Society of Petroleum Engineers (SPE), presented at the SPE Symposium: Production Enhancement and Cost Optimisation, Nov. 7-8, 2017, 14 pages.

Alboudwarej et al., "Rheology of Heavy-Oil Emulsions," SPE 97886, presented at the 2005 SPE/PS-CIM/CHOA International Thermal Operations and Heavy Oil Symposium, SPE Production & Operations, Aug. 2007, 9 pages.

Alghamdi et al., "SmartWater Synergy with Surfactant Chemicals: An Electro-Kinetic Study," SPE-197239-MS, Society of Petroleum Engineers (SPE), presented at the Abu Dhabi International Petroleum Exhibition and Conference, Nov. 11-14, 2019, 12 pages.

Alghazal et al., "Integrated Water Management and Surveillance Strategies in a Giant Carbonate Field from Saudi Arabia," SPE 164421, Society of Petroleum Engineers (SPE), presented at the SPE Middle East Oil and Gas Show and Conference, Manama, Bahrain, Mar. 2013, 8 pages.

Alkandari et al., "Technical Advancement of Carbonate Acid Stimulation Injection," SPE-197982-MS, Society of Petroleum Engineers (SPE), presented at the SPE Kuwait Oil & Gas Conference and Show, Oct. 13-16, 2019, 22 pages.

Allenson et al., "Application of Emulsion Viscosity Reducers to Lower Produced Fluid Viscosity," OTC 22443, Offshore Technology Conference, Oct. 4-6, 2011, 10 pages.

Alsabagh et al., "Demulsification of W/O emulsion at petroleum field and reservoir conditions using some demulsifiers based on polyethylene and propylene oxides," Egyptian Journal of Petroleum, vol. 25, Issue 4, Egyptian Petroleum Research Institute, Dec. 2016, 11 pages.

(56) References Cited

OTHER PUBLICATIONS

Alves et al., "Influence of the salinity on the interfacial properties of a Brazilian crude oil-brine systems," Fuel 118: 21-26, Feb. 15, 2014, 6 pages.

Al-Yaari et al., "Pressure drop reduction of stable water-in-oil emulsion flow: Role of water fraction and pipe diameter," IPTC 16883, presented at the International Petroleum Technology Conference, Mar. 26-28, 2013, 9 pages.

Arabzadeh and Amani, "Application of a Novel Ultrasonic Technology to Improve Oil Recovery with an Environmental Viewpoint," Journal of Petroleum and Environmental Biotechnology 08:02, Jan. 2017, 6 pages.

Arffin et al., "The rheology of light crude oil and water-in-oil emulsion," Procedia Engineering vol. 148, 4th International Conference on Process Engineering and Advanced Materials, Dec. 2016, 7 pages.

Ayirala et al., "Water ion interactions at crude oil-water interface: A new fundamental understanding of SmartWater flood," SPE 183894-MS, Society of Petroleum Engineers (SPE), presented at the SPE Middle East Oil and Gas Show and Conference, Mar. 6-9, 2017, 17 pages.

Beaubien et al., "Monitoring of near-surface gas geochemistry at the Weyburn, Canada, CO2-EOR site, 2001-2011," International Journal of Greenhouse Gas Control, Elsevier Ltd., Jun. 2013, 16(1):S236-S262, 27 pages.

Brouwer et al., "Recovery Increase through Water Flooding with Smart Well Technology," SPE 68979, Society of Petroleum Engineers (SPE), presented at the SPE European Formation Damage Conference, May 21-22, 2001, 10 pages.

Bukhamsin et al., "Optimization of multilateral well design and location in a real field using a continuous genetic algorithm," SPE 136944, Society of Petroleum Engineers (SPE), presented at the SPE/DGS Annual Saudi Arabia Section Technical Symposium and Exhibition, Apr. 4-7, 2010, 16 pages.

Cetkovic et al., "A methodology for multilateral wells optimization—field case study," SPE 183004-MS, Society of Petroleum Engineers (SPE), presented at the Abu Dhabi International Petroleum Exhibition & Conference, Nov. 7-10, 2016, 18 pages.

Chen et al., "Demulsifying water-in-oil emulsions by ethyl cellulose demulsifiers studied using focused beam reflectance measurement," Chemical Engineering Science, vol. 130, Jul. 1, 2015, 10 pages.

Edabi and Davies, "Techniques for Optimum Placement of Interval Control Valve(s) in an Intelligent Well," SPE 100191, Society of Petroleum Engineers (SPE), presented at the SPE Europec/EAGE Annual Conference and Exhibition, Austria, Jun. 12-15, 2006, 11 pages.

Elmsallati and Davies, "Automatic Optimization of Infinite Variable Control Valves," IPTC-10319, International Petroleum Technology Conferences (IPTC), presented at the International Petroleum Technology Conference, Qatar, Nov. 21-23, 2005, 7 pages.

flow-industries.com (online), "AirShock Enhanced Oil Recovery," available on or before 2015, retrieved on Nov. 6, 2020, retrieved from URL <https://www.flow-industries.com/oil-and-gas-wells/>, 4 pages.

Galstyan et al., "TiO2 Nanotubes: Recent Advances in Synthesis and Gas Sensing Properties," Sensors, Oct. 2013, 13(11):14813-14838, 26 pages.

Ghosh and King, "Optimization of Smart Well Completion Design in the Presence of Uncertainty," SPE 166008, Society of Petroleum Engineers (SPE), presented at the SPE Reservoir Characterization and simulation Conference and Exhibition held in Abu Dhabi, Sep. 16-18, 2013, 17 pages.

Gilev, "Acoustic Well Stimulation of Near-Wellbore Zone for Enhanced Oil Recovery," Center of Ultrasound Technology (CUT Service), 2016, 38 pages.

Glandt, "Reservoir Aspects of Smart Wells," SPE 81107, Society of Petroleum Engineers (SPE), presented at the SPE Latin America and Caribbean Petroleum Engineering Conference, Trinidad, Apr. 27-30, 2003, 11 pages.

Haupt and Haupt, "Practical Genetic Algorithms," 2nd Edition, John Wiley & Sons, New York, 1-253, 2004, 261 pages.

Holland, "Genetic algorithms," Scientific American, 66-79, Jul. 1992, 14 pages.

Jalali et al., "Intelligent Completion System—The Reservoir Rationale," SPE 50587, Society of Petroleum Engineers (SPE), presented at the SPE European Petroleum Conference, Oct. 20-22, 1998, 6 pages.

Kokal and Alvarez, "Reducing Pressure Drop in Offshore Pipelines by Controlling the Viscosities of Pressurized Emulsions," SPE 81511, presented at the SPE Middle East Oil Show, Apr. 5-8, 2003, 10 pages.

Kokal, "Chapter 12: Crude Oil Emulsions," Petroleum Engineering Handbook—vol. 1, Sep. 30, 2006, 38 pages.

Kumar et al., "Emulsion Flooding of Heavy Oil," SPE 129914, presented at the 2010 SPE Improved Oil Recovery Symposium, Apr. 24-28, 2010, 13 pages.

Lakatos and Lakatos-Szabo, "Effect of IOR/EOR chemicals on interfacial rheological properties of crude oil/water systems," SPE 65391, Society of Petroleum Engineers (SPE), presented at the 2001 SPE International Symposium on Oilfield Chemistry, Feb. 13-16, 2001, 10 pages.

Liu et al., "Favorable Attributes of Alkaline-Surfactant-Polymer Flooding," SPE 99744, Society of Petroleum Engineers (SPE), presented at the 2006 SPE/DOE Symposium on Improved Oil Recovery, Apr. 22-26, 2006, SPE Journal, Mar. 2008, 12 pages.

Lorenz et al., "Uniform Inflow Completion System Extended Economic Field Life: A Field Case Study and Technology Overview," SPE 101895, Society of Petroleum Engineers (SPE), presented at the SPE Annual Technical Conference and Exhibition, Texas, Sep. 24-27, 2006, 9 pages.

Ma et al., "Adsorption of Cationic and Anionic Surfactants on natural and Synthetic Carbonate Materials," Journal of Colloid and Interface Science, 408:164-172, 2013, 9 pages.

Maziarz et al., "Nanostructured TiO2-based gas sensors with enhanced sensitivity to reducing gases," Beilstein Journal of Nanotechnology, Nov. 2016, 7:1718-1726, 9 pages.

Meng and Haroun, "A Novel Approach of Using Phosphate-spiked Smart Brines to Alter Wettability in Mixed Oil-wet Carbonate Reservoirs," SPE-177551-MS, Society of Petroleum Engineers, presented at the Abu Dhabi International Petroleum Exhibition and Conference held in Abu Dhabi, UAE, Nov. 9-12, 2015, 16 pages.

Mullakaev et al., "Development of Ultrasonic Equipment and Technology for Well Stimulation and Enhanced Oil Recovery," Journal of Petroleum Science and Engineering 125:201-208, 2015, 8 pages.

Nair et al., "Smart Water for Enhanced Oil Recovery by Nano-Filtration," Journal of Petroleum & Environmental Biotechnology, Mar. 2016, 7:2, 8 pages.

Naus et al., "Optimization of Commingled Production using Infinitely Variable Inflow Control Valves," SPE 90959, Society of Petroleum Engineers (SPE), presented at the SPE Annual Technical Conference and Exhibition, Texas, Sep. 26-29, 2004, 12 pages.

Pak et al., "Multiscale pore-network representation of heterogeneous carbonate rocks," AGU Publications, Water Resources Research, 52: 5433-5441, 2016, 9 pages.

Plasencia et al., "Pipe flow of water-in-crude oil emulsions: Effective viscosity, inversion point and droplet size distribution," Journal of Petroleum Science and Engineering, vol. 101, Jan. 1, 2013, 9 pages.

Qureshi et al., "The Interpretation of Permeability Changes during Acid Injection in Carbonates: A New Integrated Methodology," SPE-177609-MS, Society of Petroleum Engineers (SPE), presented at the Abu Dhabi International Petroleum Exhibition and Conference, Nov. 9-12, 2015, 8 pages.

Radcliff, "Forma Analysis and Random Respectful Recombination," EPCC-TR-91-02, proceedings of 4th International Conference and Genetic Algorithms, San Mateo, CA, 1991, 9 pages.

Rudolph, "Convergence Analysis of Canonic Genetic Algorithms," IEEE Transactions on Neural Networks, Special Issue on Evolutionary Computational 5:1, Jan. 1994, 6 pages.

Sinha et al., "Flow Equilibration Toward Horizontal Well Using Downhole Valves," SPE 68635, Society of Petroleum Engineers (56) References Cited

OTHER PUBLICATIONS (SPE), presented at the SPE Asia Pacific Oil and Gas Conference and Exhibition, Indonesia, Apr. 17-19, 2001, 6 pages.
Tagavifar et al., "Effect of pH on Absorption of Anionic Surfactants on Limestone: Experimental Study and Surface Complexation Modeling," Colloids and Surfaces A: Physiocochemical and Engineering Aspect 538:549-558, Feb. 5, 2018, 10 pages.
Thomas et al., "Alkali and Hybrid-Alkali Flooding as a Tertiary Oil Recovery Mode: Prospects and Challenges," International Journal of Petroleum and Petrochemical Engineering (IJPPE), 2:2 (22-31), 2016, 10 pages.
Tjoeng and Loro, "Viscosity Modelling of Pyrenees Crude Oil Emulsions," presented at the SPE Asia Pacific Oil and Gas Conference and Exhibition, Oct. 25-27, 2016, 18 pages.
Wasan et al., "Observations on the coalescence behavior of oil droplets and emulsion stability in enhanced oil recovery," SPE6846, Society of Petroleum Engineers (SPE) of AIME, Dec. 1978, 9 pages.
Westermark et al., "Enhanced Oil Recovery with Downhole Vibration Stimulation," SPE 67303, Society of Petroleum Engineers (SPE), presented at the SPE Production and Operations Symposium, Mar. 24-17, 2001, 13 pages.
Williams and Kokal, "Chapter 4: Fluid Sampling," Petroleum Engineering Handbook, vol. 1, Sep. 30, 2006, 44 pages.
Wooden et al., "Seismic Stimulation: An Eco-Friendly, Effective EOR Alternative," Technology Update, JPT, Aug. 2018, 3 pages.
Xylem, "ViscoClock plus Automatische Viskositatsmessung Einfach Und Genau," Jul. 1, 2016, 2 pages.
Yi et al., "Research on crude oil demulsification using the combined method of ultrasound and chemical demulsifier," Journal of Chemistry, vol. 2017, Article IDS 9147926, Mar. 2017, 8 pages.
Yousef et al., "Laboratory Investigation of the Impact of Injection-Water Salinity and Ionic Content on Oil Recovery for Carbonate Reservoirs," SPE 137634-PA, Society of Petroleum Engineers (SPE), SPE Reservoir Evaluation and Engineering 14:05, Oct. 2011, 5 pages, Abstract only.
Zhang et al., "Favorable Attributes of Alkali-Surfactant-Polymer Flooding," SPE 99744, Society of Petroleum Engineers (SPE), presented at the 2006 SPE/DOE Symposium on Improved Oil Recovery, Apr. 22-26, 2006, 13 pages.
Zhang et al., "Hyperbranched poly(amido amine) demulsifiers with ethylenediamide/1,3-propanediamine as an initiator for oil-in-water emulsions with microdroplets," Fuel, IPC Science and Technology Press, vol. 226, Apr. 11, 2018, 8 pages.
Zhang et al., "Wettability alteration and improved oil recovery by spontaneous imbibition of seawater into chalk: Impact of the potential determining ions Ca2+, Mg2+, and SO4 2−," Colloid and Surfaces, ScienceDirect, Apr. 2007, 10 pages.

* cited by examiner

INJECTION OF TAILORED WATER CHEMISTRY TO MITIGATE FOAMING AGENTS RETENTION ON RESERVOIR FORMATION SURFACE

TECHNICAL FIELD

This document relates to methods and compositions used in treating subterranean formations for enhancing hydrocarbon fluid recovery.

BACKGROUND

Enhanced oil recovery that includes gas injection can use foam injection to improve the sweep efficiency of the gas injection.

SUMMARY

This disclosure describes compositions and methods for improving hydrocarbon recovery from a subterranean formation.

In some implementations, a composition for treating a subterranean formation includes an aqueous fluid. The aqueous fluid includes positively charged divalent ions and negatively charged divalent ions.

This aspect, taken alone or combinable with any other aspect, can include the following features. The composition can include a total dissolved solids concentration between 2000 and 30,000 ppm.

This aspect, taken alone or combinable with any other aspect, can include the following features. The positively charged divalent ions can include $Mg^{2+}$ ions, $Ca^{2+}$ ions, or a combination thereof.

This aspect, taken alone or combinable with any other aspect, can include the following features. The negatively charged divalent ions can include $SO_4^{2-}$ ions.

This aspect, taken alone or combinable with any other aspect, can include the following features. The aqueous fluid can include 900 to 1000 ppm $Na^+$ ions, 30 to 300 ppm $Ca^{2+}$ ions, 100 to 1200 ppm $Mg^{2+}$ ions, 200 to 4000 ppm $SO_4^{2-}$ ions, 1000 to 20000 ppm $Cl^-$ ions, and 5 to 100 ppm $HCO_3^-$ ions.

This aspect, taken alone or combinable with any other aspect, can include the following features. The composition can include $I^-$ ions, $PO_4^{3-}$ ions, $BO_3^{3-}$ ions, or any combination thereof.

This aspect, taken alone or combinable with any other aspect, can include the following features. The composition can include 500 to 1000 ppm $I^-$ ions, $PO_4^{3-}$ ions, $BO_3^{3-}$ ions, or any combination thereof.

This aspect, taken alone or combinable with any other aspect, can include the following features. The aqueous fluid can be diluted seawater.

In some implementations, a method of treating a subterranean formation includes flowing a first aqueous solution comprising sodium ions into the subterranean formation, and flowing a second aqueous solution into the subterranean formation. The second aqueous solution can have a lower salinity than the first aqueous solution and the second aqueous solution can include positively charged divalent ions, negatively charged divalent ions, and a total dissolved solids concentration between 2000 and 30000 ppm.

This aspect, taken alone or combinable with any other aspect, can include the following features. The first aqueous solution can include at least 18,300 ppm sodium ions.

This aspect, taken alone or combinable with any other aspect, can include the following features. Flowing the second aqueous solution into the subterranean formation can include flowing 0.1 to 0.3 pore volumes of the second aqueous solution into the subterranean formation.

This aspect, taken alone or combinable with any other aspect, can include the following features. The method can include flowing a surfactant into the subterranean formation.

This aspect, taken alone or combinable with any other aspect, can include the following features. Flowing the surfactant into the subterranean formation can include flowing 0.1 to 0.3 pore volumes of the surfactant into the subterranean formation.

This aspect, taken alone or combinable with any other aspect, can include the following features. The method can include injecting a gas into the subterranean formation and generating a foam.

This aspect, taken alone or combinable with any other aspect, can include the following features. Injecting a gas into the subterranean formation can include injecting carbon dioxide gas, nitrogen gas, produced gas, or flue gas into the subterranean formation.

This aspect, taken alone or combinable with any other aspect, can include the following features. The method can include alternating injecting a gas into the subterranean formation with flowing water into the subterranean formation.

This aspect, taken alone or combinable with any other aspect, can include the following features. The method can include displacing hydrocarbons in the subterranean formation.

In some implementations, a method of treating a subterranean formation can include contacting the subterranean formation with a first aqueous solution containing sodium ions, and contacting the subterranean formation with 0.1 to 0.3 pore volumes of a second aqueous solution. The second aqueous solution can have a lower salinity than the first aqueous solution and the second aqueous solution can include positively charged divalent ions, negatively charged divalent ions, 500 to 1000 ppm of $I^-$ ions, $PO_4^{3-}$ ions, $BO_3^{3-}$ ions, or a combination thereof, and a total dissolved solids concentration between 2000 and 30,000 ppm. The method can include contacting the formation with 0.1 to 0.3 pore volumes of a surfactant, injecting a gas into the formation, and generating a foam.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Enhanced oil recovery increases the production of an oil well, for example, by gas injection to displace hydrocarbons that cannot otherwise be recovered. In some instances, foam injection is used in conjunction with gas injection to overcome gas mobility challenges during gas injection processes. Foam enhances the gas sweep efficiency by reducing the injected gas mobility by increasing its apparent viscosity and decreasing its relative permeability.

Accordingly, the stabilization of foam under the harsh conditions of a reservoir is a major challenge. In addition, the surfactants or foaming agents present in the foam can adsorb to the surface of the formation. Adsorption of surfactants or foaming agents can disrupt the foam stability and lead to reduced sweep efficiency. Further, the loss of surfactant or foaming agent to the formation surface leads to a reduction in the concentration of injected surfactants or foaming agents, and in turn, accelerates the collapse rate of foam films and increases the rate of foam destabilization.

A potential solution to the stabilization and adsorption problems is the use of a sacrificial agent. A sacrificial agent can be a less-costly surfactant or another chemical that is injected into the wellbore before the injection of the foam. The sacrificial agent adsorbs to the surface of the formation, forming a barrier between the formation and the surfactants yet to be injected. However, sacrificial agents can be costly and inefficient. Accordingly, there is a need for a less costly sacrificial agent or preflush, in order to improve foam stability and decrease surfactant adsorption, efficiently and at a lower cost.

Figure 1:
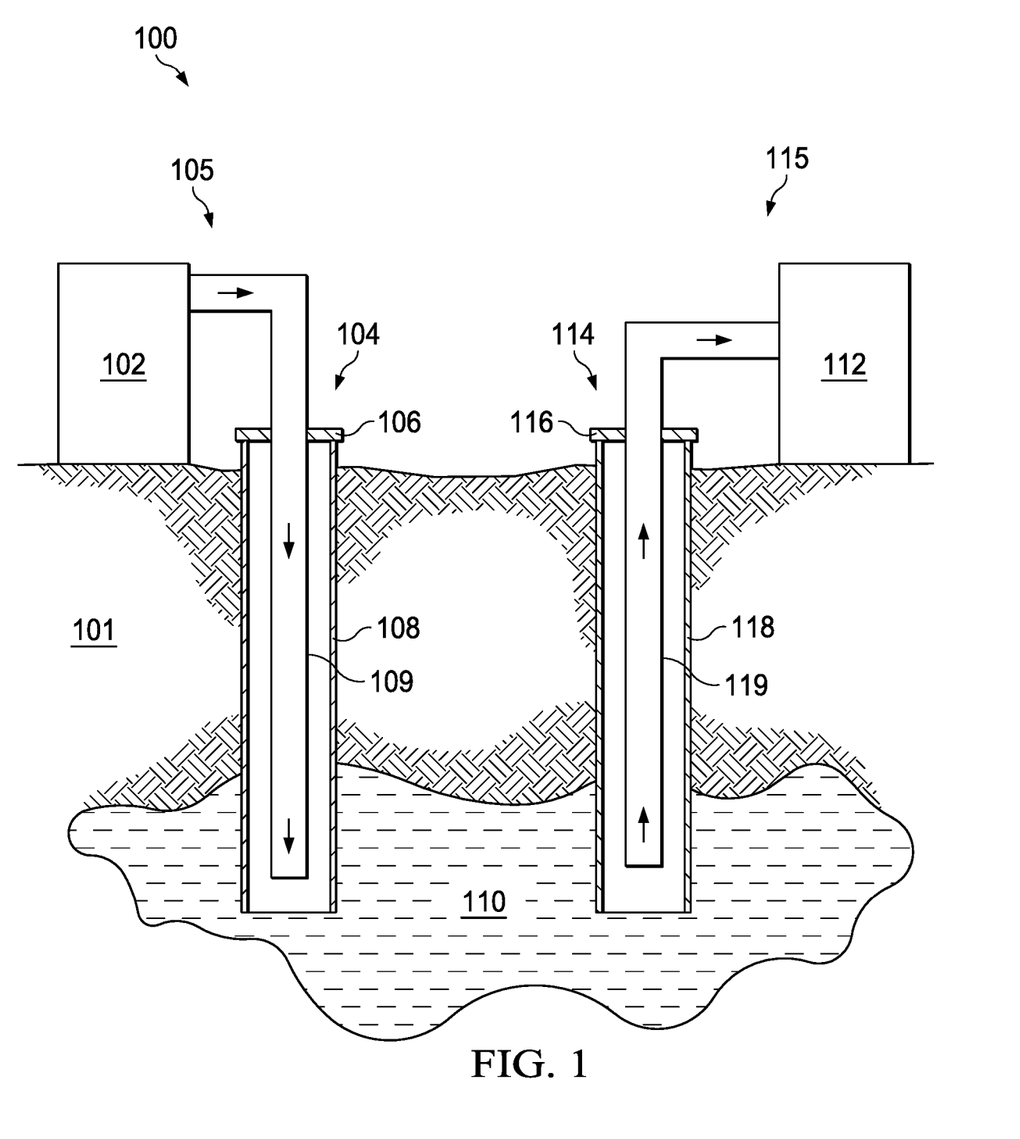
FIG. 1 is a schematic of an example system for treating of a subterranean formation.

Provided in this disclosure, in part, are methods, compositions, and systems for improving foam stability and decreasing surfactant adsorption in enhanced oil recovery. The compositions include customizable low-salinity aqueous solutions, i.e., "tailored water." The tailored water can be used in enhanced oil recovery as a preflush or sacrificial agent to increase hydrocarbon production. The tailored water improves the stability of the foams and decreases adsorption of the surfactant to formation surfaces. In some implementations, a tailored water can be injected into a subterranean formation before treating the formation with surfactants or foam. FIG. 1 shows a schematic of an example system 100 for treating a subterranean formation with tailored water. The system can include an injection site 105 with a pump 102 and a wellbore 104. The tailored water can be injected, pumped, or flowed into a subterranean formation. For example, the pump 102 can be used to pump the tailored water through the wellbore 104. The wellbore can include casing 108 and a well head 106. The tailored water formulation can be pumped through a work string 109 into a subterranean formation or fracture 110. The surface of the formation 101 is contacted with the tailored water. The tailored water treats the surface of the formation 101 and can sweep the formation and improve oil recovery at a production site 115. In some implementations, at least a portion of the tailored water is recovered at production site 115, for example, through a second wellbore 114. The second wellbore can include casing 118, a well head 116, and a work string 119. In some implementations, the production site includes a production pump 112.

The tailored water solutions are low-salinity aqueous solutions. In some implementations, the tailored water includes between 2000 and 30000 parts per million (ppm) of total dissolved solids (TDS). This TDS range encompasses the salinities of the most of the low salinity waters that are typically available, for example, lake water, river water, treated seawater from reverse osmosis (RO), and treated seawater from nanofiltration (NF), and other waters obtained by blending of 5-50% seawater with RO treated seawater (fresh water). The lower the TDS, the more stable surfactants are in aqueous solutions. Both lower salinity and specific individual ions in the tailored water will alter electric double layer forces and surface charges in such a way that the adsorption loss of surfactant on the rock surface is decreased. The tailored water solutions can include positive and negative divalent ions. For example, the tailored water can include magnesium ions ($Mg^{2+}$), calcium ions ($Ca^{2+}$), sulfate ions ($SO_4^{2-}$), or a combination thereof. In some implementations, the tailored water can also include iodide ions (I), phosphate ions ($PO_4^{3-}$), borate ions ($BO_3^{3-}$), or a combination thereof.

The tailored water can improve the stability of subsequent surfactants and foams, for example, by sweeping the formation and by influencing the interaction between the surfactants and the formation, resulting in a decreased adsorption of surfactant. In addition, the tailored water can broaden the range of surfactants that can be used for a given type of formation.

Figure 2:
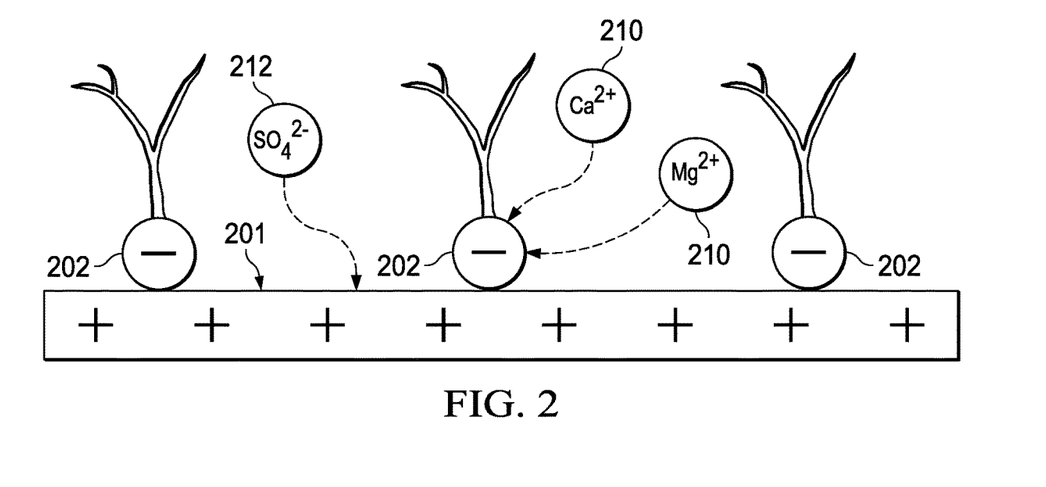
FIG. 2 shows an example of a positively charged formation treated with a tailored water including positively charged divalent ions.

In more detail, the tailored water can sweep the formation to displace small amounts or droplets of oil or hydrocarbons left behind after a formation was largely swept of oil. The residual oil or hydrocarbons can have a destabilizing effect on foams. The tailored water displaces the oil droplets by interrupting the attractive forces between the oil and the formation. For example, hydrocarbon chains with negatively charged head groups can interact with a positively charged surface, such as calcite. FIG. 2 shows an example of a positively charged subterranean formation 201 with oil droplets 202 on the surface of the formation. The tailored water includes positively charged divalent ions 210 and negatively charged divalent ions 212. The positively charged divalent ions, for example, calcium ions ($Ca^{2+}$) and magnesium ions ($Mg^{2+}$), can disrupt this interaction and displace the oil droplets 202 from the surface of the subterranean formation. This can increase the amount of oil produced from the formation, as well as clean and clear the surface of the subterranean formation 201. Accordingly, the tailored water improves the stability of foams that are subsequently introduced into the formation.

The tailored water formulations can also decrease the amount of surfactant that is adsorbed to a subterranean formation. The interaction between the surfactants and the formation surface is influenced by the chemical structure of the surfactant and of the formation minerals. The ionic and molecular interactions between the foaming agent and the formation surface that govern adsorption include hydrogen bonding, covalent bonding, electrostatic attractive forces, van der Waals repulsive forces, and hydrocarbon interaction with formation hydrophobic sites. The electrostatic attraction between the injected surfactants or foaming agents and the formation surface due to the differences in electrical charges can affect the amount of surfactant adsorbed by the formation surface significantly. Further, interactions between the surfactant and the surface can limit the type of surfactant that can be used in the formation. For example, cationic surfactants, which contain a positively charged head, are typically not injected into negatively charged formations, such as sandstone formations. Similarly, anionic surfactants, which contain a negatively charged head, are typically not injected into positively charged formations, for example, carbonate formations. This limits the types and amounts of surfactants that can be used in formations. In addition, if the formation contains a mixture of positively and negatively charged surfaces, neither surfactant will be ideal. Further, it is often desirable to mix different types of surfactants (e.g., cationic and anionic) to ensure the generation and stabilization of foams at harsh reservoir conditions. However, these mixtures may suffer from adsorption to charged formation surfaces.

Figure 3:
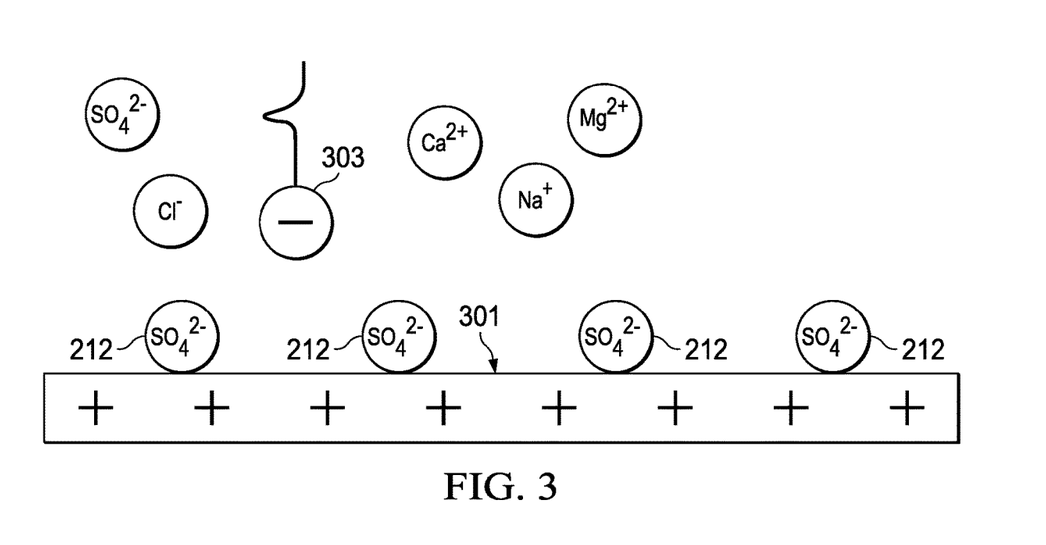
FIG. 3 shows an example of a positively charged formation treated with a tailored water including negatively charged divalent ions.

Pretreating a formation with a tailored water can negate the attractive forces between surfactants and the formation. For example, in a calcite formation, tailored water formulations can influence the magnitude of the zeta potential at the calcite/brine interface. The zeta potential is a measure of the electrical potential at the slipping plane, i.e., the interface that separates mobile fluid from fluid that is attached to a surface. A negative zeta potential indicates that the formation surface is negatively charged. A tailored water formulation can decrease the zeta potential due to the attraction between negatively charged divalent ions and a positively charged surface, for example, as shown in FIG. 3. FIG. 3 shows a positively charged formation 301, for example, a calcite formation, treated with a tailored water. Negatively charged divalent ions 212 interact with the surface of the formation 301 either to reduce the positive charge or shift the surface charge of calcite rock surface to negative. A subsequently introduced anionic surfactant 303 will be repulsed from the treated surface of the formation 301. This prevents the adsorption and loss of the anionic surfactant.

Similarly, the positively charged divalent ions in a tailored water can increase the zeta potential of a formation surface. For example, in a negative charged sandstone formation, positively charged divalent ions can adsorb to the surface and decrease the negative zeta potential of the sandstone/brine interface. Subsequently introduced cationic surfactants will be repulsed from the surface.

Accordingly, pretreatment or preflush with a tailored water clears the formation of residual oil or hydrocarbons and can prevent adsorption of surfactants or foaming agents. Therefore, the tailored water can be used in place of a sacrificial agent in subterranean formations.

Following the pre-treatment with tailored water, it is possible to inject cationic, anionic, amphoteric or a mixture of surfactants because the adsorption of these surfactants to the formation has been mitigated.

In addition, the pre-use of a tailored water solution improves the stabilization of the surfactant mixture. In turn, the stability of the surfactants and the foam generated from the surfactants increases the apparent viscosity of subsequently injected gas, thus effectively mitigating gas mobility issues encountered in gas injection applications. In addition, the use of low-salinity tailored water will decrease the cost of treatment, as no additional chemicals are needed as sacrificial agents. Finally, low salinity water can be sourced from environmentally friendly sources, for example, naturally occurring brackish, salt-, or seawater.

In some implementations, the total dissolved solids of a tailored water is between 2000 and 30000 ppm. For example, 2000 ppm, 3000 ppm, 4000 ppm, 5000 ppm, 10000 ppm, 15000 ppm, 20000 ppm, 25000 ppm, or 30000 ppm. In some implementations, the concentration of sodium ions ($Na^+$) in the tailored water chemistry can be between 900 ppm and 10000 ppm. For example, 900 ppm, 1000 ppm, 1200 ppm, 1400 ppm, 1500 ppm, 1600 ppm, 1700 ppm, 1800 ppm, 1900 ppm, 2000 ppm, 4000 ppm, 6000 ppm, 8000 ppm, or 10000 ppm. In some implementations, the concentration of calcium ions ($Ca^{2+}$) is between 0 and 500 ppm. For example, 0 ppm, 10 ppm, 20 ppm, 30 ppm, 40 ppm, 50 ppm, 100 ppm, 200 ppm, 300 ppm, 400 ppm, or 500 ppm. In some implementations, the concentration of magnesium ions ($Mg^{2+}$) is between 50 and 1200 ppm. For example, 50 ppm, 100 ppm, 200 ppm, 500 ppm, 1000 ppm, or 1200 ppm. In some implementations, the concentration of sulfate ions ($SO_4^{2-}$) is between 200 and 4000 ppm. For example, 200 ppm, 400 ppm, 600 ppm, 800 ppm, 1000 ppm, 1500 ppm, 2000 ppm, 2500 ppm, 3000 ppm, or 4000 ppm. In some implementations, the concentration of chloride ions ($Cl^-$) is between 1000 and 20000 ppm. For example, 1000 ppm, 2000 ppm, 5000 ppm, 10000 ppm, 15000 ppm, or 20000 ppm. In some implementations, the concentration of bicarbonate ions ($HCO_3^-$) can be between 0 and 100 ppm. For example, 0 ppm, 5 ppm, 10 ppm, 20 ppm, 40 ppm, 60 ppm, 80 ppm, or 100 ppm.

In some implementations, the tailored water can include diluted seawater. For example, naturally diluted seawater can be diluted with fresh or deionized water between 1 and 100 times. In some implementations, the seawater is diluted to 10× with fresh or deionized water. In some implementations, the seawater is diluted to 20× with fresh or deionized water. In some implementations, the seawater can be diluted to 2× with fresh or deionized water. The final total dissolved solids in the diluted seawater can be between 2000 and 30,000 ppm, for example, 2000 ppm, 3000 ppm, 4000 ppm, 5000 ppm, 10,000 ppm, 20,000 ppm, or 30,000 ppm. Seawater naturally contains many ionic species that are useful in a tailored water solution. For example, seawater naturally contains the divalent ions $Mg^{2+}$, $Ca^{2+}$, and $SO_4^{2-}$. In addition, seawater contains sodium, chloride, and bicarbonate ions ($Na^+$, $Cl^-$, and $HCO_3^-$).

Table 1 shows four examples of tailored waters, low salinity water 1 (LSW1), low salinity water 2 (LSW2), low salinity water 3 (LSW3), and low salinity water 4 (LSW4). Each of these tailored water solutions are aqueous solutions that can be prepared either by diluting seawater or by preparing fresh water with the concentrations of the ions as shown.

TABLE 1

Composition of Tailored Water Aqueous Solutions

| Ions | Symbol | LSW1 (ppm) | LSW2 (ppm) | LSW3 (ppm) | LSW4 (ppm) |
|---|---|---|---|---|---|
| Sodium | $Na^+$ | 9150 | 3660 | 915 | 6405 |
| Calcium | $Ca^{2+}$ | 325 | 130 | 33 | 227 |
| Magnesium | $Mg^{2+}$ | 1055 | 422 | 106 | 739 |
| Sulfate | $SO_4^{2-}$ | 2145 | 858 | 215 | 1501 |
| Chloride | $Cl^-$ | 16100 | 6440 | 1610 | 11270 |
| Bicarbonate | $HCO_3^-$ | 60 | 24 | 6 | 42 |
| Total Dissolved Solids (ppm) | | 28835 | 11534 | 2885 | 20184 |

In some implementations, the tailored water solutions contains additional ions, for example, iodide ions ($I^-$), phosphate ions ($PO_4^{3-}$), borate ions ($BO_3^{3-}$), or a combination thereof. The additional iodide, phosphate, and borate ions can preferentially adsorb to positively charged surfaces. Such adsorption will reduce the positive charges on the surfaces. Accordingly, amphoteric and anionic surfactants can be used on the treated carbonate surfaces. In some implementations, the concentration of the iodide ions ($I^-$) can be between 500 and 1000 ppm iodide. For example, 500 ppm, 600 ppm, 700 ppm, 800 ppm, 900 ppm, and 1000 ppm. In some implementations, the concentration of phosphate ions ($PO_4^{3-}$) can be between 500 and 1000 ppm. For example, 500 ppm, 600 ppm, 700 ppm, 800 ppm, 900 ppm, and 1000 ppm. In some implementations, the concentration of borate ions ($BO_3^{3-}$) can be between 500 and 1000 ppm. For example, 500 ppm, 600 ppm, 700 ppm, 800 ppm, 900 ppm, and 1000 ppm. Table 2 illustrates example compositions of tailored water solutions containing iodide, phosphate, or borate ions, or any combination thereof.

contain more than 18,300 ppm sodium ions are considered to be high salinity waters. High salinity water, for example, seawater, can be used in a pretreatment that includes a waterflooding process. The waterflooding process can maintain the formation pressure and push oil towards a production well. Because there is little or no additional cost associated with the use of high salinity water, it can be used first to recover as much as possible of the formation hydrocarbons. Subsequently, enhanced oil recovery/improved oil recovery (EOR/IR) techniques can be used to recover additional oil. In addition, the high salinity water can be used to dilute any water in the original formation. The salinity of the water in the original formation can be even higher when

TABLE 2

Composition of Tailored Aqueous Solutions

| Ions | Symbol | LSW5 (ppm) | LSW6 (ppm) | LSW7 (ppm) | LSW8 (ppm) | LSW9 (ppm) | LSW10 (ppm) | LSW11 (ppm) |
|---|---|---|---|---|---|---|---|---|
| Sodium | $Na^+$ | 10448 | 10448 | 10448 | 10448 | 10448 | 10448 | 10448 |
| Calcium | $Ca^{2+}$ | 325 | 325 | 325 | 325 | 325 | 325 | 325 |
| Magnesium | $Mg^{2+}$ | 1055 | 1055 | 1055 | 1055 | 1055 | 1055 | 1055 |
| Sulfate | $SO_4^{2-}$ | 2145 | 2145 | 2145 | 2145 | 2145 | 2145 | 2145 |
| Chloride | $Cl^-$ | 16100 | 16100 | 16100 | 16100 | 16100 | 16100 | 16100 |
| Bicarbonate | $HCO_3^-$ | 60 | 60 | 60 | 60 | 60 | 60 | 60 |
| Iodide | $I^-$ | 1000 | — | — | 1000 | 1000 | — | 1000 |
| Phosphate | $PO_4^{3-}$ | — | 1000 | — | 1000 | — | 1000 | 1000 |
| Borate | $BO_3^{3-}$ | — | — | 1000 | — | 1000 | 1000 | 1000 |
| Total Dissolved Solids (ppm) | | 31133 | 31133 | 31133 | 32133 | 32133 | 32133 | 33133 |

| Ions | Symbol | LSW12 (ppm) | LSW13 (ppm) | LSW14 (ppm) | LSW15 (ppm) | LSW16 (ppm) | LSW17 (ppm) | LSW18 (ppm) |
|---|---|---|---|---|---|---|---|---|
| Sodium | $Na^+$ | 4309 | 4309 | 4309 | 4309 | 4309 | 4309 | 4309 |
| Calcium | $Ca^{2+}$ | 130 | 130 | 130 | 130 | 130 | 130 | 130 |
| Magnesium | $Mg^{2+}$ | 422 | 422 | 422 | 422 | 422 | 422 | 422 |
| Sulfate | $SO_4^{2-}$ | 858 | 858 | 858 | 858 | 858 | 858 | 858 |
| Chloride | $Cl^-$ | 6440 | 6440 | 6440 | 6440 | 6440 | 6440 | 6440 |
| Bicarbonate | $HCO_3^-$ | 24 | 24 | 24 | 24 | 24 | 24 | 24 |
| Iodide | $I^-$ | 500 | — | — | 500 | 500 | — | 500 |
| Phosphate | $PO_4^{3-}$ | — | 500 | — | 500 | — | 500 | 500 |
| Borate | $BO_3^{3-}$ | — | — | 500 | — | 500 | 500 | 500 |
| Total Dissolved Solids (ppm) | | 12683 | 12683 | 12683 | 13183 | 13183 | 13183 | 13683 |

| Ions | Symbol | LSW19 (ppm) | LSW20 (ppm) | LSW21 (ppm) | LSW22 (ppm) | LSW23 (ppm) | LSW24 (ppm) | LSW25 (ppm) |
|---|---|---|---|---|---|---|---|---|
| Sodium | $Na^+$ | 1240 | 1240 | 1240 | 1240 | 1240 | 1240 | 1240 |
| Calcium | $Ca^{2+}$ | 33 | 33 | 33 | 33 | 33 | 33 | 33 |
| Magnesium | $Mg^{2+}$ | 106 | 106 | 106 | 106 | 106 | 106 | 106 |
| Sulfate | $SO_4^{2-}$ | 215 | 215 | 215 | 215 | 215 | 215 | 215 |
| Chloride | $Cl^-$ | 1610 | 1610 | 1610 | 1610 | 1610 | 1610 | 1610 |
| Bicarbonate | $HCO_3^-$ | 6 | 6 | 6 | 6 | 6 | 6 | 6 |
| Iodide | $I^-$ | 250 | — | — | 250 | 250 | — | 250 |
| Phosphate | $PO_4^{3-}$ | — | 250 | — | 250 | — | 250 | 250 |
| Borate | $BO_3^{3-}$ | — | — | 250 | — | 250 | 250 | 250 |
| Total Dissolved Solids (ppm) | | 3460 | 3460 | 3460 | 3710 | 3710 | 3710 | 3960 |

| Ions | Symbol | LSW26 (ppm) | LSW27 (ppm) | LSW28 (ppm) | LSW29 (ppm) | LSW30 (ppm) | LSW31 (ppm) | LSW32 (ppm) |
|---|---|---|---|---|---|---|---|---|
| Sodium | $Na^+$ | 7379 | 7379 | 7379 | 7379 | 7379 | 7379 | 7379 |
| Calcium | $Ca^{2+}$ | 227 | 227 | 227 | 227 | 227 | 227 | 227 |
| Magnesium | $Mg^{2+}$ | 739 | 739 | 739 | 739 | 739 | 739 | 739 |
| Sulfate | $SO_4^{2-}$ | 1501 | 1501 | 1501 | 1501 | 1501 | 1501 | 1501 |
| Chloride | $Cl^-$ | 11270 | 11270 | 11270 | 11270 | 11270 | 11270 | 11270 |
| Bicarbonate | $HCO_3^-$ | 42 | 42 | 42 | 42 | 42 | 42 | 42 |
| Iodide | $I^-$ | 750 | — | — | 750 | 750 | — | 750 |
| Phosphate | $PO_4^{3-}$ | — | 750 | — | 750 | — | 750 | 750 |
| Borate | $BO_3^{3-}$ | — | — | 750 | — | 750 | 750 | 750 |
| Total Dissolved Solids (ppm) | | 21908 | 21908 | 21908 | 22658 | 22658 | 22658 | 23408 |

Figure 4:
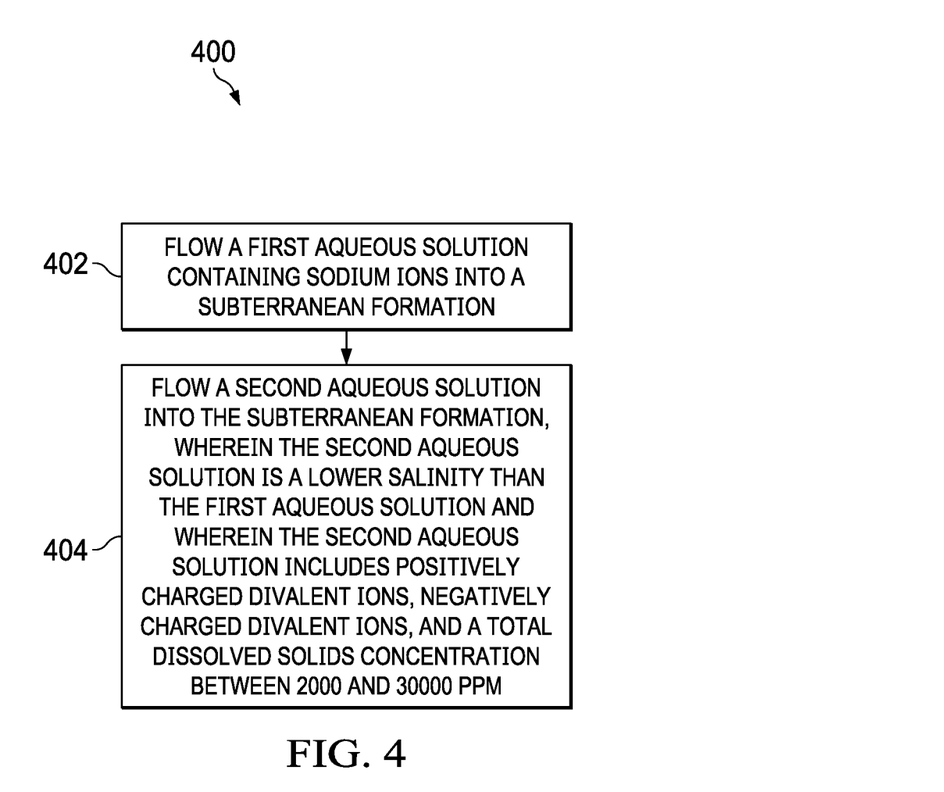
FIG. 4 is a flowchart of an example method of treating a subterranean formation.

In some implementations, the tailored waters as described herein can be used in a method of treating a subterranean formation. In some implementations, the tailored waters can be used to treat a subterranean formation that has been pre-treated with a high salinity water. Aqueous solutions that compared to injection water, therefore, in some implementations it is advantageous to dilute the formation salinity before implementing any EOR/IOR methods. In addition, it is better to inject chemicals, for example, foaming agents and oil-water interfacial tension reducers, into a formation that has low salinity water. Diluting the formation water can be done using a low salinity water preflush, however, this will add to the cost of the project as large volumes are needed to dilute the formation water. Therefore, a preflush of high salinity water can dilute the formation water and prepare the formation for subsequent treatment. FIG. 4 is a flowchart of an example method 400 of treating a subterranean formation. At 402, a first aqueous solution containing sodium ions is flowed into a subterranean. For example, the first aqueous solution can be seawater. At 404, a second aqueous solution is flowed into the subterranean formation, wherein the second aqueous solution is a lower salinity than the first aqueous solution and wherein the second aqueous solution includes positively charged divalent ions, negatively charged divalent ions, and a total dissolved solids concentration between 2000 and 30000 ppm. In some implementations, injecting the subterranean formation with the second aqueous solution includes injecting 0.1 to 0.3 pore volumes of the second aqueous solution into the formation. The pore volume can be calculated or estimated as the bulk volume of rock in a formation multiplied by the porosity. In some implementations, the second aqueous solution is a tailored water, for example, any of the LSW solutions described above. In some implementations, after injection of the low salinity water, 0.1 to 0.3 pore volumes of a surfactant is injected into the formation. The surfactant can be an anionic surfactant, a cationic surfactant, an amphoteric surfactant, or a mixture thereof. The surfactant can be chosen based on the composition of the subterranean formation. After injecting a surfactant, a gas can be injected into the formation to generate a foam. The gas can be carbon dioxide ($CO_2$) gas, nitrogen gas ($N_2$), produced gas, or flue gas. Produced gas, i.e., the gas produced by burning hydrocarbons, can include hydrocarbon gasses and non-hydrocarbon gasses. The non-hydrocarbon gasses can include $CO_2$ and $N_2$. Flue gas is the exhaust gas from hydrocarbon burning processes, for example, from a power plant. Flue gas is typically released into the atmosphere and can include $CO_2$ and $N_2$. Accordingly, the use of produced or flue gas utilizes what would otherwise have been a waste product. Optionally, the method can include using alternating gas and water cycles to further displace hydrocarbons in the formation. In addition, the method described above can be used to displace other subterranean fluids or gasses. For example, a preflush with a tailored water can be used in a method to displace hydrocarbons, gas, water, or any other subterranean material from a subterranean formation.

As used in this disclosure, the term "fluid" refers to liquids and gels, unless otherwise indicated. As used in this disclosure, the term "subterranean formation" or "subterranean zone" refers to any material under the surface of the earth, including under the surface of the bottom of the ocean. For example, a subterranean zone or formation can be any section of a wellbore and any section of a subterranean petroleum- or water-producing formation or region in fluid contact with the wellbore. Placing a material in a subterranean zone can include contacting the material with any section of a wellbore or with any subterranean region in fluid contact the material. Subterranean materials can include any materials placed into the wellbore such as cement, drill shafts, liners, tubing, casing, or screens; placing a material in a subterranean zone can include contacting with such subterranean materials. In some examples, a subterranean zone or formation can be any downhole region that can produce liquid or gaseous petroleum materials, water, or any downhole section in fluid contact with liquid or gaseous petroleum materials, or water. For example, a subterranean zone or formation can be at least one of an area desired to be fractured, a fracture or an area surrounding a fracture, and a flow pathway or an area surrounding a flow pathway, in which a fracture or a flow pathway can be optionally fluidly connected to a subterranean petroleum- or water-producing region, directly or through one or more fractures or flow pathways.

As used in this disclosure, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, aquifer remediation, identifying oil rich regions via imaging techniques, and the like.

A number of implementations of the disclosure have been described. Nevertheless, it will be understood that various modifications may be made without departing from the spirit and scope of the disclosure.

What is claimed is:

1. A method of treating a subterranean formation, comprising:
    flowing a first aqueous solution comprising sodium ions into the subterranean formation; and
    flowing a second aqueous solution into the subterranean formation, wherein the second aqueous solution is a lower salinity than the first aqueous solution and wherein the second aqueous solution comprises
      positively charged divalent ions,
      negatively charged divalent ions,
      500 to 1000 ppm of $I^-$ ions, $PO_4^{3-}$ ions, $BO_3^{3-}$ ions, or a combination thereof, and
      a total dissolved solids concentration between 2000 and 30000 ppm.

2. The method of claim 1, wherein flowing the first aqueous solution comprising sodium ions into the subterranean formation comprises flowing a first aqueous solution comprising at least 18,300 ppm sodium ions into the subterranean formation.

3. The method of claim 1, wherein flowing the second aqueous solution into the subterranean formation comprises flowing 0.1 to 0.3 pore volumes of the second aqueous solution into the subterranean formation.

4. The method of claim 1, further comprising flowing a surfactant into the subterranean formation.

5. The method of claim 4, wherein flowing the surfactant into the subterranean formation comprises flowing 0.1 to 0.3 pore volumes of the surfactant into the subterranean formation.

6. The method of claim 4, further comprising:
    injecting a gas into the subterranean formation; and
    generating a foam.

7. The method of claim 6, wherein injecting a gas into the subterranean formation comprises injecting carbon dioxide gas, nitrogen gas, produced gas, or flue gas into the subterranean formation.

8. The method of claim 6, further comprising:
    injecting a gas into the subterranean formation; and
    after injecting the gas into the subterranean formation, flowing water into the subterranean formation.

9. The method of claim 6, further comprising displacing hydrocarbons in the subterranean formation.

10. The method of claim 1, wherein the second aqueous solution further comprises:
   900 to 1000 ppm $Na^+$ ions;
   30 to 300 ppm $Ca^{2+}$ ions;
   100 to 1200 ppm $Mg^{2+}$ ions;
   200 to 4000 ppm $SO_4^{2-}$ ions;
   1000 to 20000 ppm $Cl^-$ ions; and
   5 to 100 ppm $HCO_3^-$ ions.

11. The composition of claim 1, wherein the second aqueous solution comprises diluted seawater.

12. A method of treating a subterranean formation, comprising:
   contacting the subterranean formation with a first aqueous solution containing sodium ions;
   contacting the subterranean formation with 0.1 to 0.3 pore volumes of a second aqueous solution, wherein the second aqueous solution is a lower salinity than the first aqueous solution and wherein the second aqueous solution comprises
      positively charged divalent ions,
      negatively charged divalent ions,
      500 to 1000 ppm of $I^-$ ions, $PO_4^{3-}$ ions, $BO_3^{3-}$ ions, or a combination thereof,
      and a total dissolved solids concentration between 2000 and 30000 ppm;
   contacting the formation with 0.1 to 0.3 pore volumes of a surfactant;
   injecting a gas into the formation; and
   generating a foam.

13. The method of claim 12, wherein the second aqueous solution further comprises:
   900 to 1000 ppm $Na^+$ ions;
   30 to 300 ppm $Ca^{2+}$ ions;
   100 to 1200 ppm $Mg^{2+}$ ions;
   200 to 4000 ppm $SO_4^{2-}$ ions;
   1000 to 20000 ppm $Cl^-$ ions; and
   5 to 100 ppm $HCO_3^-$ ions.

14. The composition of claim 12, wherein the second aqueous solution comprises diluted seawater.

15. The composition of claim 12, wherein injecting a gas into the subterranean formation comprises injecting carbon dioxide gas, nitrogen gas, produced gas, or flue gas into the subterranean formation.

16. The composition of claim 12, further comprising:
   injecting a gas into the subterranean formation; and
   after injecting the gas into the subterranean formation, flowing water into the subterranean formation.

17. The composition of claim 12, further comprising displacing hydrocarbons in the subterranean formation.

18. The method of claim 12, wherein:
   the second aqueous solution further comprises:
      diluted seawater;
      900 to 1000 ppm $Na^+$ ions;
      30 to 300 ppm $Ca^{2+}$ ions;
      100 to 1200 ppm $Mg^{2+}$ ions;
      200 to 4000 ppm $SO_4^{2-}$ ions;
      1000 to 20000 ppm $Cl^-$ ions; and
      5 to 100 ppm $HCO_3^-$ ions;
   injecting a gas into the subterranean formation comprises injecting carbon dioxide gas, nitrogen gas, produced gas, or flue gas into the subterranean formation; and
   the method further comprises displacing hydrocarbons in the subterranean formation.

* * * * *